United States Patent
Lehner et al.

[19]

[11] Patent Number: 6,108,600

[45] Date of Patent: Aug. 22, 2000

[54] APPARATUS AND METHOD FOR SHIFTING INTO A LOWER GEAR OF A MANUAL TRANSMISSION

[75] Inventors: Steven E. Lehner; Mark E. Rettig, both of Peoria, Ill.

[73] Assignee: Caterpillar Inc., Peoria, Ill.

[21] Appl. No.: 08/887,575

[22] Filed: Jul. 3, 1997

[51] Int. Cl.[7] ................................................. F16H 59/04
[52] U.S. Cl. ............................. 701/56; 701/55; 477/135
[58] Field of Search .................................. 701/51, 52, 55, 701/56; 477/135, 137, 139, 140, 144

[56] References Cited

U.S. PATENT DOCUMENTS

| | | | |
|---|---|---|---|
| 4,622,637 | 11/1986 | Tomita et al. | 364/424.1 |
| 5,636,120 | 6/1997 | Yesel et al. | 364/424.08 |
| 5,809,835 | 12/1998 | Beim et al. | 74/335 |
| 5,916,292 | 6/1999 | Issa et al. | 701/62 |
| 5,941,922 | 8/1999 | Price et al. | 701/51 |

*Primary Examiner*—Tan Nguyen
*Assistant Examiner*—Dalena Tran
*Attorney, Agent, or Firm*—Byron G. Buck, II

[57] ABSTRACT

A method and apparatus for controllably shifting into a lower gear of a manual transmission is disclosed. A high downshift speed value is established and stored in a memory. The downshift speed variable of the manual transmission is set equal to the high downshift speed value for a duration time in response to a control signal. The manual transmission is controllably shifted into a lower gear when an engine speed becomes equal to or less than the downshift speed variable.

20 Claims, 4 Drawing Sheets

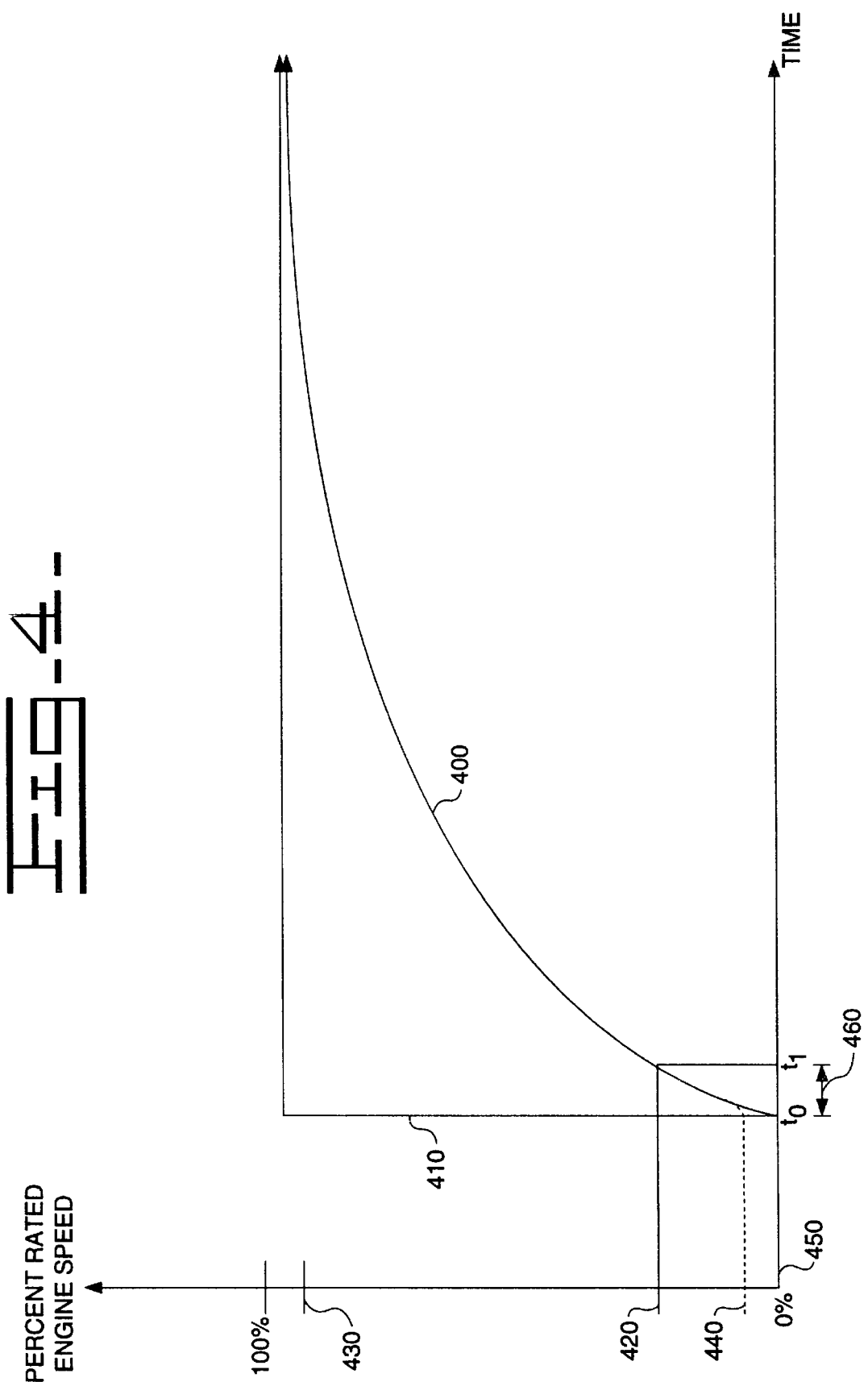

6,108,600

APPARATUS AND METHOD FOR SHIFTING INTO A LOWER GEAR OF A MANUAL TRANSMISSION

TECHNICAL FIELD

This invention relates generally to a method and apparatus for shifting into a lower gear of a manual transmission, and more particularly, to controllably downshifting manual transmission.

BACKGROUND ART

On-highway trucks having manual transmissions are often used to move payloads over long distances. The manual transmissions used in on-highway trucks can have any number of gears and typically have 10,13 or 18 gears or speeds. Generally, a stick shift is used in automobiles to change between gears of a five speed manual transmission by moving the stick shift to a position corresponding to the desired gear. However, with so many more gears used in on-highway trucks, it is common for a single stick position to be used for more than one gear.

Conventionally, a shuttle switch and/or a range switch is often used to shift between gears sharing the same stick shift position. For example, on a manual transmission having ten gears and a shuttle switch, the stick shift only moves through five positions in order to downshift from the tenth gear through all of the gears to the first gear. When the transmission is in tenth gear, the operator downshifts into ninth gear while the engine is below the downshift speed by operating the shuttle switch. To downshift into eighth gear while currently in ninth gear, the driver shifts into eighth gear by moving the stick shift into the corresponding position when the engine speed is below the downshift speed. This pattern generally continues until the driver moves the stick shift into the first position and operates the shuttle switch to shift into first gear.

Currently, traffic disturbances are often due to a driver slowing down to below the downshift speed before shifting into a lower gear while going up a hill. Traffic disturbances can also occur due to a driver slowing down to below the downshift speed before shifting into a lower gear to accelerate quickly enough to pass a slow moving car merging into traffic or to accelerate enough to turn into another lane at a speed consistent with the existing flow of traffic in the other lane. In these examples, the truck driver may cause a traffic disturbance by failing to operate the truck properly.

Typically, the driver must slow the truck down before shifting into a lower gear because the highest allowed downshift speed is typically set at an engine speed desirable for driving on an open highway. However, the downshift speed for driving on an open highway is generally much lower than the downshift speed desired in high traffic situations similar to the examples above. Although the shift stick could have a position for each gear or the downshift speeds could be set at higher speeds, these could potentially make the truck substantially more difficult to operate.

Currently, the truck driver must ensure that the truck is properly operated to prevent traffic disturbances. In the normal operation of a truck, many events are occurring simultaneously. This increases the potential for driver error, including the risk of incorrectly operating the truck by not having the most desired gear engaged at the proper time.

The present invention is directed to overcoming one or more of the problems as set forth above.

DISCLOSURE OF THE INVENTION

In one aspect of the present invention, an apparatus for controllably shifting into a lower gear of a manual transmission is provided. The manual transmission has a downshift speed variable and is coupled to an engine having an engine speed. The apparatus includes a memory, a secondary shift mechanism and a controller. The memory is adapted to store a high downshift speed value. The secondary shift mechanism is adapted to provide a control signal to the controller. The controller is in communication with the memory and is adapted to receive the control signal. Further, the controller sets the transmission downshift speed variable equal to the high downshift speed value in response to the control signal. Additionally, the controller is adapted to shift the manual transmission into a lower gear when the engine speed is equal to or less than the downshift speed variable.

In another aspect of the present invention, a method for controllably shifting into a lower gear of a manual transmission is provided. The manual transmission has a downshift speed variable and a secondary shift mechanism. Further, the manual transmission is coupled to an engine having an engine speed. A high downshift speed value is established. The downshift speed variable is set equal to the high downshift speed value in response to the secondary shift mechanism. Additionally, the manual transmission is shifted into a lower gear when the engine speed is equal to or less than the downshift speed variable.

In another aspect of the present invention, a method for shifting into a lower gear of a manual transmission is provided. The manual transmission has a downshift speed variable and is coupled to an engine having an engine speed. A low limit, a high limit and a high downshift speed value are established. A control signal and the engine speed are sensed. A determination is made as to whether the control signal has transitioned from less than or equal to the low limit to greater than or equal to the high limit within a transition time. The downshift speed variable is set equal to the high downshift speed value in response to the control signal. Additionally, the manual transmission is shifted into a lower gear when the engine speed is equal to or less than the downshift speed variable.

These and other aspects and advantages of the present invention will become apparent to those skilled in the art upon reading the detailed description of the best mode for carrying out the invention in connection with the drawings and appended claims.

BRIEF DESCRIPTION OF THE DRAWINGS

For a better understanding of the invention, reference may be made to the accompanying drawings, in which:

FIG. 4 is a graph illustrating the change in a raw value of a control signal and the change in a filtered value of the control signal over time in a preferred embodiment of the present invention.

BEST MODE FOR CARRYING OUT THE INVENTION

Figure 1:
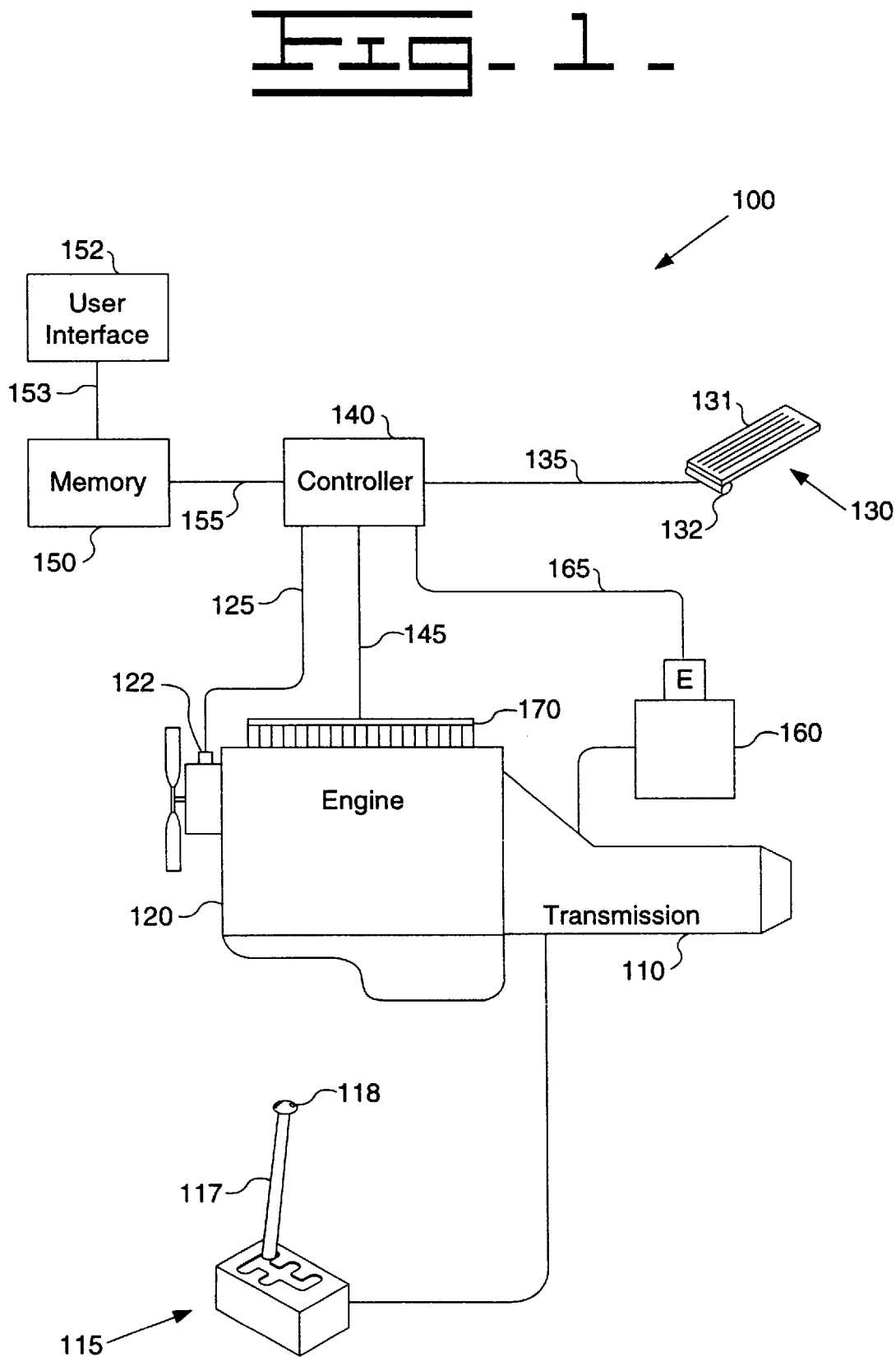
FIG. 1 is a schematic diagram of a preferred embodiment of the present invention.

A preferred embodiment of the present invention provides an apparatus 100 and method for controllably shifting into a lower gear of a manual transmission 110. In FIG. 1, a manual transmission 110 coupled to an engine 120 is shown. The manual transmission 110 has a plurality of gears (not shown), a primary shift mechanism 115, preferably a stick shift 117 having a shuttle switch 118, and a downshift speed variable. Preferably, an engine speed sensor 122 is associated with the engine 120 and produces an engine speed signal representative of the engine speed, preferably provided to a controller 140 over a first electrical connector 125. Because the vehicle speed and transmission speed are proportional to the engine speed when the transmission 110 is in gear, the term "engine speed" as used herein includes transmission speed, vehicle speed or preferably engine speed. The controller 140 is in communication with a memory 150, preferably over a second electrical connector 155.

A secondary shift mechanism 130 is also shown in FIG. 1. The term "secondary shift mechanism" 130 as used herein includes a pushbutton, a switch, a keypad, a console, a computer, a LCD display, pedals, levers, arms, other input devices readily known in the art or preferably, a fuel pedal 131. The secondary shift mechanism 130 provides a control signal, preferably over the third electrical connector 135. In a preferred embodiment of the present invention, the fuel pedal 131 provides a desired engine speed signal which is determined as a function of the movement of the fuel pedal 131 and the control signal is a transition in the desired engine speed signal. Further, the fuel pedal 131 has a displacement sensor 132. The displacement sensor 132 could be one of many displacement sensors readily known in the art, but is preferably a rotary sensor. Additionally, the displacement sensor 132 provides the desired engine speed signal to the controller 140 as a function of the movement of the fuel pedal 131.

The memory 150 has a high downshift speed value, and preferably a low limit 420 and a high limit 430, stored in it. The high downshift speed value is stored in the memory 150 and represents the maximum speed at which the controller 140 will controllably downshift the manual transmission 110 into a lower gear. Advantageously, the high downshift speed value is 1350 RPM for a ten speed transmission and 1450 RPM for a thirteen speed or eighteen speed transmission. However, other values can be readily and easily used for the high downshift speed value without deviating from the scope of the present invention as defined by the appended claims. In a specific embodiment, the high limit 430 and low limit 420 represent a maximum and a minimum threshold, respectively, for comparing to the control signal. In a specific embodiment of the present invention, the memory 150 also stores a duration time representing a duration of time for maintaining the downshift speed variable equal to the high downshift speed value.

The controller 140 is adapted to receive the control signal. The controller 140 sets the downshift speed variable equal to the high downshift speed value for the duration time in response to the control signal. Additionally, the controller 140 is adapted to produce a shift signal once the engine speed signal is less than or equal to the downshift speed variable. Advantageously, at least one solenoid 160 is adapted to shift the manual transmission 110 into a lower gear in response to the shift signal from the controller 140. Preferably, the shift signal is provided to the solenoid 160 over the fourth electrical connector 165.

In a preferred embodiment, the controller 140 is a 68HC11 microcontroller manufactured by Motorola located in Schaumburg, Ill. However, other suitable microcontrollers are known in the art, any one of which could be readily and easily used in connection with an embodiment of the present invention. The specific program code can be readily and easily written from either flowchart, shown in FIG. 2 or FIG. 3, in the specific assembly language or microcode for the selected microcontroller.

In a specific embodiment of the present invention, the control signal is a transition in the fueling condition of the engine which corresponds to the movement of the secondary shift mechanism 130.

The controller 140 establishes a fueling condition provided to the engine 120 over a fifth electrical connector 145. Once the fueling condition transitions from substantially less than or equal to the low limit 420 to substantially greater than or equal to the high limit 430 within a transition time 460, the controller 140 sets the downshift speed variable equal to the high downshift speed value for the duration time.

In a specific embodiment of the present invention, the engine 120 has fuel injectors 170. The time that the fuel injectors 170 are injecting fuel into the engine 120 is the injector duration, and the fueling condition is the injector duration.

In a specific embodiment of the present invention, a user interface 152 is used to provide the high downshift speed value, the duration time, and preferably the high limit 430 and the low limit 420 to the memory 150 over a sixth electrical connector 153.

In a preferred embodiment of the present invention, the low limit 420 and the high limit 430 are stored in the memory 150. Further, the control signal is a transition in the desired engine speed signal, which corresponds to the movement of the secondary shift mechanism 130. When the desired engine speed signal transitions from substantially less than or equal to the low limit 420 to substantially greater than or equal to the high limit 430 within a transition time 460, the controller 140 sets the downshift speed variable equal to the high downshift speed value for the duration time.

In a specific embodiment of the present invention, the secondary shift mechanism 130 is a switch or preferably a pushbutton (not shown). The pushbutton (not shown) is adapted to provide to the controller 140 a control signal. Once the control signal transitions from less than or equal to the low limit 420 to greater than or equal to the high limit 430, the controller 140 sets the downshift speed variable equal to the high downshift speed value.

Figure 2:
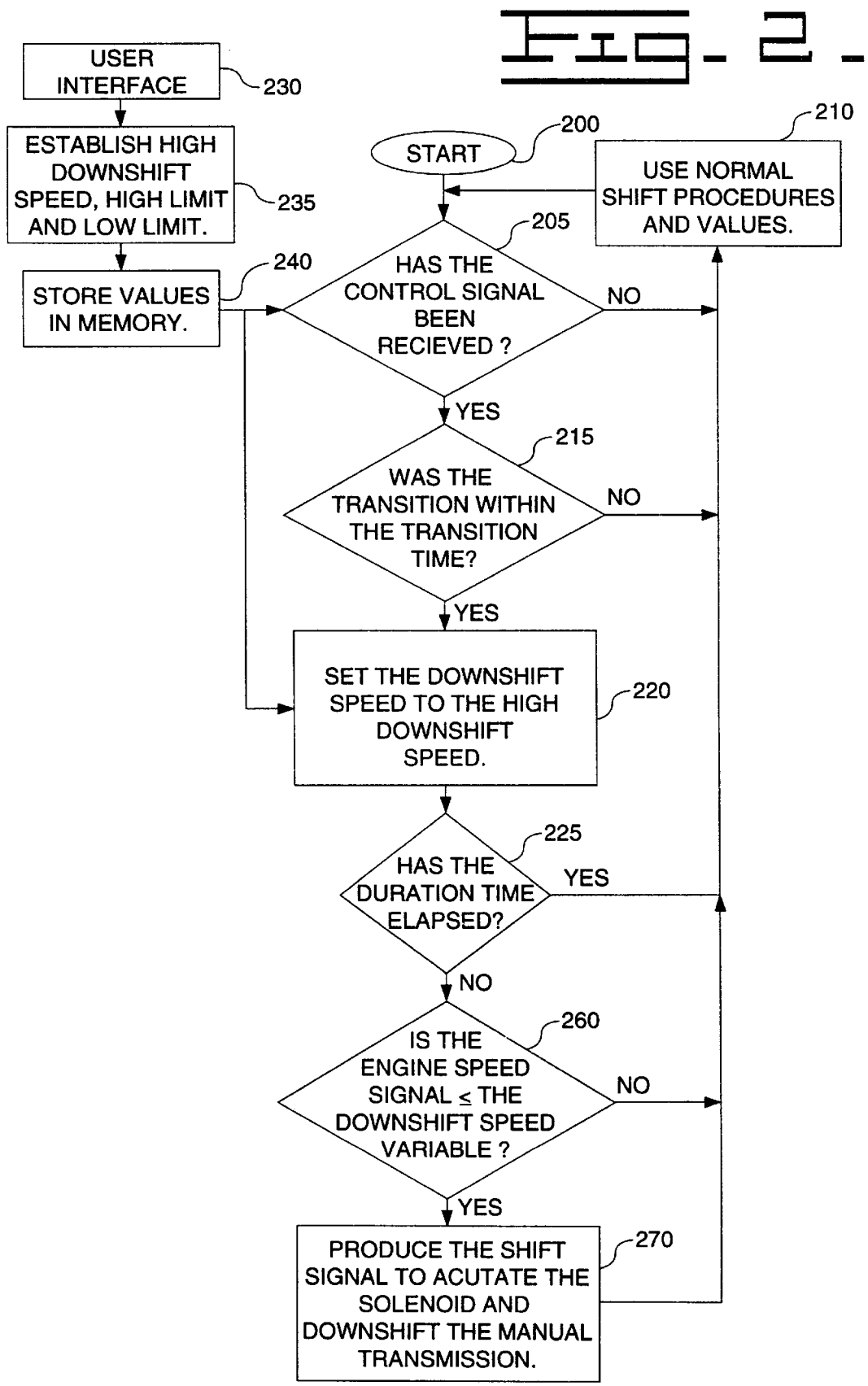
FIG. 2 is a flow chart illustrating software used in connection with an embodiment of the present invention.

Now referring to FIG. 2, in a first block 200, program control of a specific embodiment of the present invention begins. Program control passes to a first decision block 205.

In first decision block 205, the controller 140 determines whether the control signal has been received. In a specific embodiment, the control signal is a transition of the fueling condition from less than or equal to the low limit 420, stored in memory 150, to greater than or equal to the high limit 430, stored in memory 150. Preferably, the fueling condition is determined by the injector duration. However, the control signal is preferably a transition from less than or equal to the low limit 420 to greater than or equal to the high limit 430 in a desired engine speed signal which corresponds to the movement of the secondary shift mechanism 130. The secondary shift mechanism is preferably a fuel pedal 131. If the control signal has been received, then program control passes to second decision block 215.

Otherwise, program control passes to second block 210.

In second decision block 215, the controller 140 determines whether the transition was within the transition time 460. If the transition was not within the transition time 460, then program control passes to second block 210. Otherwise, program control passes to third block 220.

In third block 220, the downshift speed variable is set to the high downshift speed value stored in memory 150. From third block 220, program control passes to third decision block 225.

In third decision block 225, the controller 140 determines whether the duration time has elapsed. If the duration time has elapsed, then program control passes to second block 210. Otherwise, program control passes to fourth decision block 260.

In fourth decision block 260, the controller 140 determines whether the engine speed signal is less than or equal to the downshift speed variable. If the engine speed signal is greater than the downshift speed variable, then program control passes to second block 210. Otherwise, program control passes to seventh block 270.

In seventh block 270, the shift signal is produced. In response to the shift signal, the at least one solenoid 160 actuates and the manual transmission downshifts into a lower gear. From seventh block 270, program control passes to second block 210.

In second block 210, the controller 140 reverts back to using normal shift procedures and values including the normal downshift speed values used for driving on an open highway. Program control then passes to first decision block 205. In first decision block 205, the controller 140 determines whether the control signal has been received as described above.

In fourth block 230, the user interface 152 provides the high downshift speed value, the low limit 420 and the high limit 430. In fifth block 235, these values are established. In sixth block 240, the high downshift speed value, high limit 430 and low limit 420 are stored in memory 150. The high downshift speed value, high limit 430 and low limit 420 are provided to the first decision block 205 and the third block 220.

Figure 3:
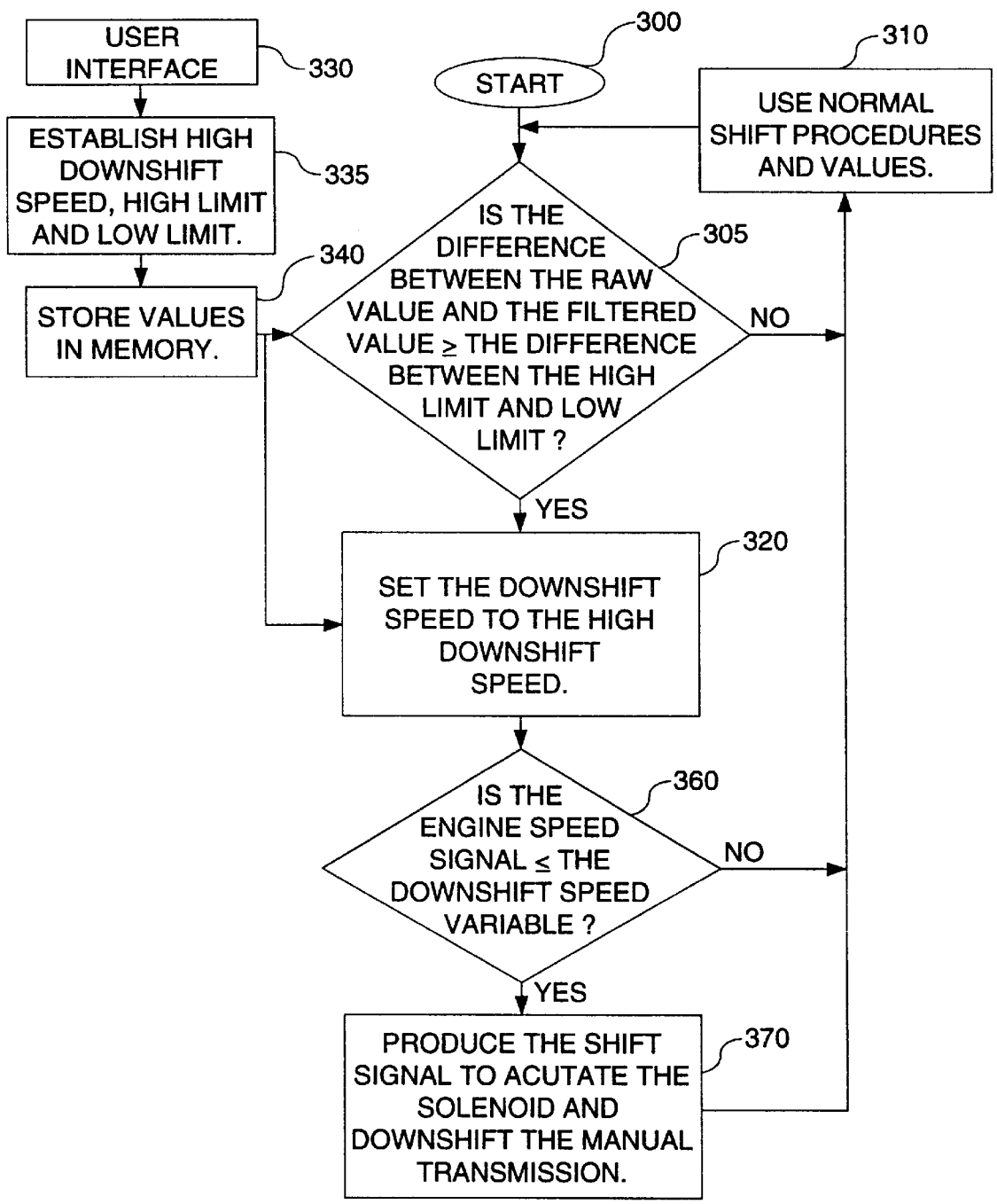
FIG. 3 is a flow chart illustrating software used in connection with a preferred embodiment of the present invention.

Now referring to FIG. 3, in a tenth block 300, program control of a preferred embodiment of the present invention begins. Program control passes to a tenth decision block 305.

In tenth decision block 305, the controller 140 determines whether the difference between the raw value 410 and the filtered value 400 is greater than or equal to the difference between the high limit 430 and the low limit 420. If the difference between the raw value 410 and the filtered value 400 is less than the difference between the high limit 430 and the low limit 420, then program control passes to eleventh block 310. Otherwise, program control passes to twelfth block 320.

Referring now to FIG. 4, in a preferred embodiment of the present invention, the desired engine speed signal is filtered to produce a filtered value 400. The filtered value 400 is compared to the raw value 410 of the desired engine speed signal. The controller 140 determines that the desired engine speed signal transitioned from less than or equal to the low limit 420 to greater than or equal to the high limit 430 by determining whether the difference between the raw value 410 and the filtered value 400 is greater than or equal to the difference between the high limit 430 and the low limit 420. In a specific embodiment, the filtered value 400 is reinitialized whenever the raw value 410 is substantially equal to an idle engine 120 injector duration or fuel pedal displacement value 440. However, the filtered value 400 is preferably reinitialized whenever the raw value 410 substantially corresponds to a substantially zero engine 120 injector duration or fuel pedal displacement value 450. Furthermore, commonly known error checking and debouncing techniques are preferably used during filtering and comparing the signals. It should be understood that the fueling condition could be filtered similar to the desired engine speed signal and should be understood to be within the scope of the present invention as defined by the appended claims.

In a preferred embodiment of the present invention, the transition time 460 and duration time are determined by the type of filtering used to produce the filtered value 400. The type of filtering determines the amount by which the filtered value 400 lags the raw value 410. The time period, shown as $t_1-t_0$, which the difference between the raw value 410 and the filtered value 400 is greater than or equal to the difference between the high limit 430 and the low limit 420 is preferably the transition time 460. In a specific embodiment, the transition time 460 and the duration time are preferably the same, such that the downshift speed variable is set equal to the high downshift speed value substantially when the difference between the raw value 410 and the filtered value 400 is greater than or equal to the difference between the high limit 430 and the low limit 420.

Therefore, the type of filtering determines the duration time and the transition time 460.

Referring now to FIG. 3, in twelfth block 320 the downshift speed variable is set to the high downshift speed value stored in memory 150. From twelfth block 320, program control passes to eleventh decision block 360.

In eleventh decision block 360, the controller 140 determines whether the engine speed signal is less than or equal to the downshift speed variable. If the engine speed is greater than the downshift speed variable, then program control passes to eleventh block 310. Otherwise, program control passes to thirteenth block 370.

In thirteenth block 370, the shift signal is produced and the solenoid 160 actuates which results in the manual transmission downshifting into a lower gear. From thirteenth block 370, program control passes to eleventh block 310.

In eleventh block 310, the controller 140 reverts back to using normal shift procedures and values including the normal downshift speed values used for driving on an open highway. Program control then passes to tenth decision block 305. In tenth decision block 305, the controller 140 determines whether the difference between the raw value 410 and a filtered value 400 is greater than or equal to the difference between the high limit 430 and the low limit 420 as described above.

In fourteenth block 330, the user interface 152 provides the high downshift speed value, the low limit 420 and the high limit 430. From fourteenth block 330, program control passes to fifteenth block 335. In fifteenth block 335, these values are established. From fifteenth block 335, program control passes to sixteenth block 340. In sixteenth block 340, the high downshift speed value, high limit 430 and low limit 420 are stored in the memory 150.

From sixteenth block 340, the high downshift speed value is provided to twelfth block 320. From sixteenth block 340, the high limit 430 and low limit 420 are provided to tenth decision block 305.

While aspects of the present invention have been particularly shown and described with reference to the preferred embodiment above, it will be understood by those skilled in the art that various additional embodiments may be contemplated without departing from the spirit and scope of the present invention. For example, a method or apparatus 100 of the present invention may have a manual transmission 110 coupled to an electric motor having a motor speed or other type of prime mover instead of an engine. Further, because transmission speed and vehicle speed are proportional to engine speed when the vehicle is in gear, transmission speed and vehicle speed and appropriate values and variables could be used. However, such devices or methods should be understood to fall within the scope of the present invention as determined based upon the claims below and any equivalents thereof.

INDUSTRIAL APPLICABILITY

On-highway trucks having manual transmissions 110 are often used to transport payloads over long distances. In high traffic situations, a driver may need to downshift into a lower gear to avoid traffic disturbances. By downshifting into a lower gear, the truck is often more capable of adapting to the changes in traffic flow and avoiding traffic disturbances.

The method and apparatus 100 of certain embodiments of the present invention, when compared with other methods and apparatus 100, may have the advantages of permitting the driver to more effectively control the truck, avoiding the undesirable effects of increasing the normal downshift speed to a level undesirable for driving on the open highway, and being more economical to use, maintain, and manufacture. Such advantages are particularly worthy of incorporating into the design, manufacture and operation of on-highway trucks. In addition, the present invention may provide other advantages that have not been discovered yet.

It should be understood that while the preferred embodiment is described in connection with on-highway trucks having a manual transmission 110 coupled to an engine 120, the present invention is readily adaptable to provide controllable shifting to a lower gear of a manual transmission 110 on other vehicles.

Other aspects, objects and advantages of the present invention can be obtained from a study of the drawings, the disclosure and the appended claims.

What is claimed is:

1. An apparatus for controllably shifting into a lower gear of a manual transmission having a downshift speed variable and coupled to an engine having an engine speed, comprising:
   a memory adapted to store a high downshift speed value;
   a secondary shift mechanism adapted to provide a control signal; and
   a controller in communication with the memory, adapted to receive the control signal, adapted to set the downshift speed variable equal to the high downshift speed value for the duration time in response to the control signal and adapted to controllably shift the manual transmission into a lower gear when the engine speed is equal to or less than the downshift speed variable.

2. The apparatus as set forth in claim 1, wherein the memory is adapted to store a low limit and a high limit, the controller is adapted to establish a fueling condition corresponding to the movement of the secondary shift mechanism and set the downshift speed variable equal to the high downshift speed value for a duration time in response to the control signal, the control signal being the fueling condition transitioning from substantially less than or equal to the low limit to substantially greater than or equal to the high limit within a transition time.

3. The apparatus as set forth in claim 2, wherein the engine has an injector duration and the fueling condition is the injector duration.

4. The apparatus as set forth in claim 2, including a user interface for providing the high downshift speed value, the low limit and the high limit.

5. The apparatus as set forth in claim 1, wherein the memory is adapted to store a low limit and a high limit and the controller is adapted to set the downshift speed variable equal to the high downshift speed value for a duration time in response to the control signal, the control signal being the desired engine speed signal transitioning from substantially less than or equal to the low limit to substantially greater than or equal to the high limit within a transition time.

6. The apparatus as set forth in claim 5, wherein the secondary shift mechanism is a fuel pedal having a displacement sensor adapted to provide the engine speed signal in relation to the movement of the fuel pedal.

7. The apparatus as set forth in claim 5, including a user interface for providing the high downshift speed value, the low limit and the high limit.

8. The apparatus as set forth in claim 1, including at least one solenoid responsive to the controller and adapted to shift the manual transmission into a lower gear.

9. The apparatus as set forth in claim 1, wherein the control signal is a desired engine speed signal having a raw value and a filtered value and the controller is adapted to set the downshift speed variable equal to the high downshift speed value in response to the difference between the raw value and the filtered value being greater than or equal to the difference between the high limit and the low limit.

10. The apparatus as set forth in claim 1, wherein the secondary shift mechanism is a pushbutton.

11. A method for controllably shifting into a lower gear of a manual transmission having a downshift speed variable and a secondary shift mechanism and being coupled to an engine having an engine speed, comprising the steps of:
    establishing a high downshift speed value;
    setting the downshift speed variable equal to the high downshift speed value for a duration time in response to the movement of the secondary shift mechanism; and
    controllably shifting the manual transmission into a lower gear in response to the engine speed being equal to or less than the downshift speed value.

12. The method of claim 11, wherein the engine has a fueling condition corresponding to the movement of the secondary shift mechanism, including the steps of:
    establishing a low limit and a high limit and setting the downshift speed variable equal to the high downshift speed value for the duration time in response to the fueling condition transitioning from substantially less than or equal to the low limit to substantially greater than or equal to the high limit within a transition time.

13. The method of claim 12, wherein the fueling condition is an injector duration, including the steps of:
    monitoring the injector duration and setting the downshift speed variable equal to the high downshift speed value for the duration time in response to the injector duration transitioning from substantially less than or equal to the low limit to substantially greater than or equal to the high limit within a predetermined time.

14. The method of claim 12, including the step of providing the high downshift speed value, low limit and high limit from a user interface.

15. The method of claim 11, including the steps of:
    establishing a low limit and a high limit and setting the downshift speed variable equal to the high downshift speed value for the duration time in response to the movement of the secondary shift mechanism transitioning from substantially less than or equal to the low limit to substantially greater than or equal to the high limit within a transition time.

16. The method of claim 15, wherein the secondary shift mechanism is a fuel pedal adapted to provide a desired engine speed signal, including the steps of:

monitoring the desired engine speed signal and setting the downshift speed variable equal to the high downshift speed value for the duration time in response to the desired engine speed signal transitioning from substantially less than or equal to the low limit to substantially greater than or equal to the high limit within a transition time.

17. The method of claim 16, wherein the desired engine speed signal has a raw value and a filtered value, including the step of;

determining whether the desired engine speed signal has transitioned from substantially less than or equal to the low limit to substantially greater than or equal to the high limit within a transition time by determining whether the difference between the raw value and the filtered value is greater than or equal to the difference between the high limit and the low limit.

18. The method of claim 15, including the step of providing the high downshift speed value, low limit and high limit from a user interface.

19. A method for controllably shifting into a lower gear of a manual transmission having a downshift speed variable and coupled to an engine having an engine speed, comprising the steps of:

establishing a low limit, a high limit and a high downshift speed value;

sensing a control signal and the engine speed;

determining whether the control signal has transitioned from less than or equal to the low limit to greater than or equal to the high limit within a transition time;

setting the downshift speed variable equal to the high downshift speed value for a duration time in response to the step of determining whether the control signal has transitioned from less than or equal to the low limit to greater than or equal to the high limit within a transition time; and controllably shifting the manual transmission into a lower gear in response to the engine speed being equal to or less than the downshift speed variable.

20. The method of claim 19, wherein the control signal has a raw value, including the steps of:

filtering the raw value to produce a filtered value; and determining whether the control signal has transitioned from less than or equal to the low limit to greater than or equal to the high limit within a transition time by determining whether the difference between the raw value and the filtered value is greater than or equal to the difference between the high limit and the low limit.

* * * * *